(12) United States Patent
Betz

(10) Patent No.: US 6,575,425 B1
(45) Date of Patent: Jun. 10, 2003

(54) INTERFACE VALVE FOR VACUUM SEWER SYSTEMS

(75) Inventor: Reinhold Betz, Tostedt (DE)

(73) Assignee: Roediger Vakuum- und Maustechnik GmbH (DE)

( * ) Notice: Subject to any disclaimer, the term of this patent is extended or adjusted under 35 U.S.C. 154(b) by 0 days.

(21) Appl. No.: 09/645,374

(22) Filed: Aug. 24, 2000

(51) Int. Cl.⁷ .................................................. F16K 7/07
(52) U.S. Cl. ............................................. 251/5; 251/175
(58) Field of Search ............................. 251/5, 4, 175

(56) References Cited

U.S. PATENT DOCUMENTS

| | | | |
|---|---|---|---|
| 2,026,916 A | | 1/1936 | Smith |
| 2,518,625 A | | 8/1950 | Langstaff |
| 3,479,001 A | | 11/1969 | Dower |
| 3,936,028 A | | 2/1976 | Norton et al. |
| 3,984,080 A | * | 10/1976 | Varis et al. ................... 251/5 |
| 4,013,557 A | * | 3/1977 | Snodgrass et al. ........... 251/5 X |
| 4,096,211 A | * | 6/1978 | Rameau ....................... 251/5 X |
| 4,111,391 A | | 9/1978 | Pilolla |
| 4,132,382 A | * | 1/1979 | Jackson ......................... 251/5 |
| 4,135,550 A | * | 1/1979 | AnderSson ................. 251/5 X |
| 4,245,672 A | * | 1/1981 | Schott Malo et al. ....... 251/5 X |
| 4,465,258 A | * | 8/1984 | Weingarten .................... 251/5 |
| 4,494,345 A | * | 1/1985 | Peterson .................... 251/5 X |
| 4,742,593 A | | 5/1988 | Kallenbach |
| 5,535,983 A | * | 7/1996 | Hohermuth .................... 251/5 |

* cited by examiner

Primary Examiner—David A. Scherbel
Assistant Examiner—Eric Keasel
(74) Attorney, Agent, or Firm—Ansel M. Schwartz

(57) ABSTRACT

A pinch-type interface valve for vacuum sewer systems. The interface valve includes a valve chamber and therein a tube-like elastic element. The elastic element has a lateral seal section with seal strips. The seal strips are pressed against each other and tightened when the elastic element is axially compressed. The elastic element is expanded and the seal strips are pulled from each other when vacuum is transmitted into the valve chamber.

28 Claims, 4 Drawing Sheets

INTERFACE VALVE FOR VACUUM SEWER SYSTEMS

FIELD OF THE INVENTION

The present invention is related to an interface valve for vacuum sewer systems. In a vacuum sewer system, wastewater that has been collected in a sump, e.g. in a collection sump, a bowl of a vacuum toilet, or in a urinal or wash basin, is evacuated through the interface valve. When the interface valve opens, atmospheric pressure drives the wastewater through the interface valve and through vacuum pipes towards a vacuum source. Some air is usually admitted after the wastewater has passed. The interface valve is opened and closed by a controller. Typically, the controller and the interface valve are operating pneumatically.

BACKGROUND OF THE INVENTION

A pneumatically operated interface valve has been described in U.S. Pat. No. 4,171,853. This interface valve is a piston valve including a valve body, a plunger, a valve piston and a valve seat. The plunger is connected with a pneumatic operation element, such as a bellow. When vacuum is transmitted from the vacuum source through the controller to the operating element, the plunger pulls the piston from the valve seat and opens the interface valve. When atmospheric air is transmitted to the operating element through the controller, the piston returns to the valve seat thus closing the valve.

Such piston valves are large, expensive and have the additional disadvantage that the piston slams on the valve seat when the valve is closed because the piston is pulled by vacuum force against the valve seat. Fracture of the valve body is a frequent problem. Another problem is that the plunger penetrates a bore of the valve body and moves through the bore. A seal is required, e.g. a lip seal. The seal needs to be frequently greased. Particles in the wastewater can jam and destroy the seal.

OBJECT OF THE INVENTION

Object of the present invention is to provide a pneumatically operated interface valve without the discussed disadvantages of the interface valves of the prior art. In addition, the new interface valve should be small, simple, reliable and inexpensive to manufacture.

SUMMARY OF THE INVENTION

An interface valve according to the present invention has a valve casing with an inflow connection for collected wastewater and an outflow connection to the vacuum source. The valve casing includes a chamber that is either in communication with atmospheric or above-atmospheric pressure, or is in communication with sub-atmospheric (vacuum) pressure. The chamber includes a tube-like elastic element that is axially compressed between the inflow and the outflow connection. The elastic element comprises an inflow nozzle and an outflow nozzle, the inflow nozzle being extended towards the inflow connection of the valve casing, the outflow nozzle being extended towards the outflow connection of the valve casing. The nozzles are connected with each other through a seal section, the seal section consisting of seal strips. The seal strips are pressed against each other, when the chamber is in communication with atmospheric pressure, and removed from each other, when the chamber is in communication with sub-atmospheric pressure.

Each nozzle has two ends, a circular and a linear or approximately linear end. The circular open ends are attached to the inflow connection and the outflow connection respectively. The linear mouth ends of the nozzles are connected with each other.

The seal strips extend along a lateral or transversal axis that is oriented approximately perpendicular to the longitudinal axis of the tube-like elastic element. The seal strips can have a linear or curved shape, a curved shape being preferably convex in the direction to the outflow connection. A curved shape of the seal strips improves tight closing of the interface valve.

The pinch valve, or more specifically the seal strips of the elastic element, are kept tight by axial compression of the tube-like elastic element, unless the elastic element is laterally expanded by vacuum pressure in the chamber surrounding the elastic element. The elastic element is shaped such that the seal strips are laterally pressed against each other by axial compression force exerted on the elastic element. The pinch valve is closed even when both connections and the chamber in the valve casing are in communication with the same pressure, e.g. atmospheric pressure. When vacuum is transmitted through the outflow connection into the outflow nozzle, the outflow nozzle is pulled together and the seal strips at the bottom of the nozzle are tightened. When overpressure is transmitted into the chamber, both nozzles are laterally compressed thus further compressing the seal strips. When vacuum is transmitted into the chamber, the nozzles are laterally pulled and expanded until the seal strips are removed from each other and the interface valve is open.

An axial or longitudinal section through the elastic element shows two isosceles triangles while the elastic element is shut. In other words, the elastic element is shaped like an hourglass. The seal strips extend laterally at a common angle point where both isosceles triangles meet. The nozzles preferably have different lengths, the outflow nozzle being shorter than the inflow nozzle. The isosceles triangles have different heights. The seal strips can have a bead-like reinforcement reducing wear of the seal strips resulting from repeated bending of the seal strips during valve operation. The seal strips may also be provided with seal lips.

A view of the elastic element from a different direction shows two trapezoids, while the elastic element is closed, the trapezoids being connected along a common line. The seal strips extend along this line forming the bottom of both nozzles. This line may be curved, preferably convex towards the outflow nozzle.

The elastic element is made of elastic material, such as natural or synthetic rubber, so that the interface valve can be opened and closed several hundred thousand times without breaking. In addition the elastic material provides for a watertight and airtight seal section.

It is further suggested to reinforce the outflow nozzle. This reinforcement prevents indentation of this nozzle by vacuum suction from the outflow connection, and increases the sealing force between the seal strips. The outflow nozzle could include metallic reinforcement plates or strips at those sections of the nozzle that are shaped like a trapezoid. Alternatively, or in addition, these nozzle sections could be made of particularly thick and strong material. Preferably the outflow nozzle is pre-stressed such that it has a convex cross section when no pressure difference is applied.

The elastic element further comprises a first open end and a second open end, the ends being provided with circular rims. The rims are fixed to the valve casing. The rims may be U-shaped, each rim comprising a peripheral edge. The valve casing may be provided with grooves, the grooves being coaxial with the rims of the elastic element. The connections of the interface valve may be formed by sockets that are fixed to the valve casing, e.g. by solvent welding or by a threaded connection. The elastic rims of the elastic element form seals between the sockets and the valve casing. The rims may have edges that are placed into the grooves. The rims are compressed between the valve casing and the sockets. The distance between the grooves of the valve casing is shorter than the length of the elastic element. The elastic element is axially compressed and shortened when the rims are fixed in the grooved. In other words, the length of the elastic element is shortened while it is attached to the valve casing. Compression stress is transmitted to the seal strips through the nozzles in a direction with an axial and radial component, the radial component laterally pressing the seal strips against each other.

The valve casing preferably comprises threads for the attachment of threaded sockets. The rims of the elastic element are compressed between the casing and the sockets and seal gaps between the sockets and the valve casing. The sockets comprise pipe sections for the attachment of couplings, e.g. rubber couplings, connecting the pipe sections with an inflow pipe for wastewater and an outflow pipe towards the vacuum source.

The elastic element while being open, i.e. while being laterally expanded by vacuum in the valve chamber, should permit passage of a sphere that has at least the same diameter as the internal diameter D of the inflow pipe and of the outflow pipe. Clogging of the valve by large solids is thus prevented. The length l of each seal strip should be longer than 50% of the perimeter of the pipe sections (2*l>Π*D). A tube formed by the expanded elastic element should have a circular cross section that is at least as large as the cross section of the pipe sections.

The interface valve may have a servo-valve integrated in the valve casing.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
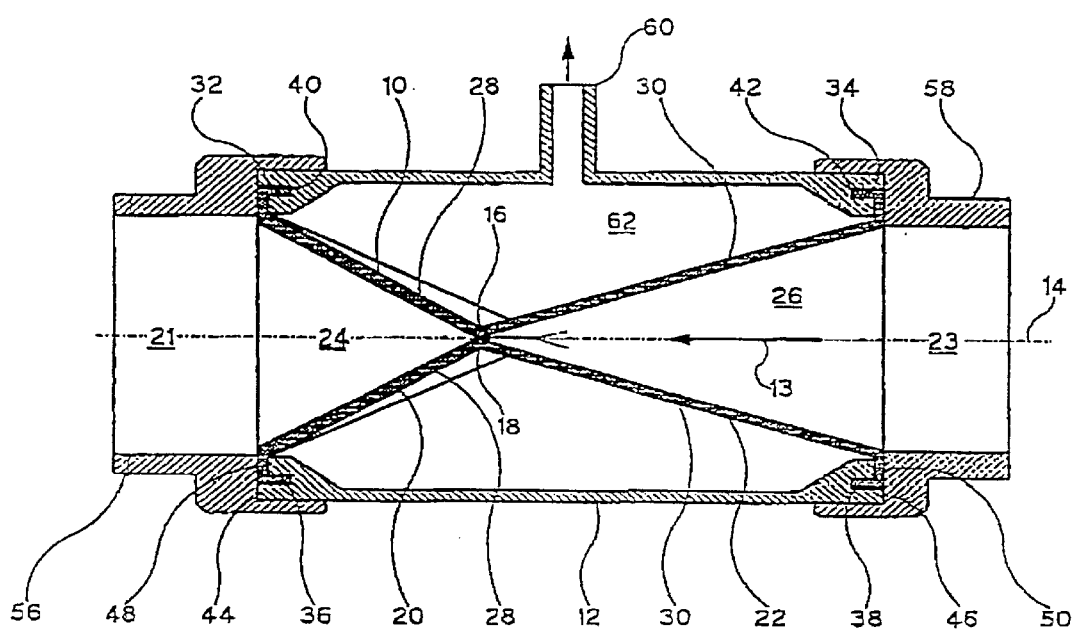
FIG. 1 shows an axial cross section through an interface valve with an elastic element.

Referring now to the drawings wherein like reference numerals refer to similar or identical parts throughout the several views, and more specifically to FIG. 1 thereof, there is shown an interface valve for a vacuum sewer system. The interface valve does not include a plunger, a piston or a valve seat. The interface valve is simple, made of few components, and it is small and short.

The interface valve includes a tube-like elastic element 10 arranged in a valve casing 12 such that the elastic element 10 is axially compressed along axis 14 (the direction of the compression force is indicated by an arrow 13). Elastic element 10 comprises a seal section with a pair of seal strips 16 and 18. The seal strips 16 and 18 extend in lateral direction and are pressed against each other as the elastic element is axially compressed. The seal strips 16 and 18 may be straight or curved (as shown in FIG. 2).

The elastic element 10 is formed such that it comprises a first nozzle 22 and a second nozzle 20, the first nozzle 22 extending towards an inflow connection 23, the second nozzle extending towards an outflow connection 21. The first nozzle 22 is longer than the second nozzle 20.

Nozzles 20 and 22 each have an isosceles cross section and a triangular shape with a common angle point that is located on the axis 14 between the seal strips 16 and 18.

Figure 2:
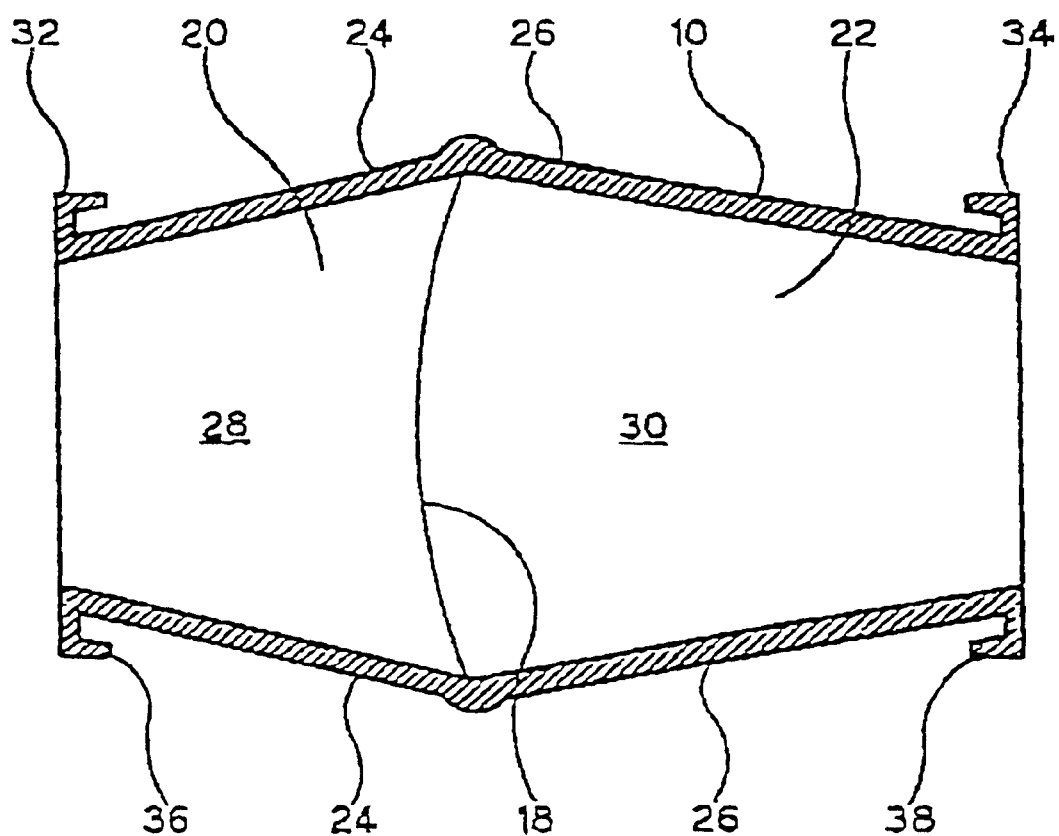
FIG. 2 shows an axial cross section through the elastic element of FIG. 1, whereby the elastic element has been axially turned by approx. 90 degrees.

FIG. 2 shows another cross-section through the same elastic element 10, whereby the elastic element 10 has been turned around axis 14 by approx. 90 degrees. Viewed in this direction, the nozzles 20 and 22 are shaped like trapezoids 28 and 30. The nozzles 10 and 22 have sections 24 and 26 extending towards the curved seal strip 18. The curved seal strip 18 connects the nozzles 20 and 22 with each other. The seal strip 18 may comprise an edge or a seal lip. Nozzle 22 is longer than nozzle 20. Seal strip 18 may also be reinforced to reduce wear.

Nozzle 20 has a rim 32 with a peripheral U-shaped edge 36. Rim 32 is attached to the outflow connection 21. Nozzle 22 has a rim 34 with a peripheral edge 38. Rim 34 is attached to the inflow connection 23. Edge 38 is placed in a groove 42 of the valve casing 12 while edge 36 is placed in another groove 40 of the valve casing 12. Groove 42 is provided at a front end 46, and groove 40 at a rear end 44 of the valve casing 12. Rim 34 includes a peripheral section 50 that is squeezed between the front end 46 of valve casing 12 and a socket 58 forming the inflow connection 23. Rim 32 includes a peripheral section 48 that is squeezed between the rear end 44 of valve casing 12 and another socket 56 forming the outflow connection 21. The sockets 56 and 58 could be fixed to the valve casing 12 by threads, solvent welding, by friction or by other equivalent means. The distance from the front end 46 to the rear end 44 of valve casing 12 is smaller than the distance between the front rim 34 and the rear rim 36 of elastic element 10 before elastic element 10 is mounted into the valve casing 12. During assembly of the interface valve, elastic element 10 is shortened by compression so that the seal strips 16 and 18 are pressed against each other.

Valve casing 12 comprises a pressure connection 60 for transmittal of atmospheric or sub-atmospheric (vacuum) pressure into a chamber 62. Pressure in chamber 62 compresses the elastic element 10 laterally. When atmospheric or higher pressure is transmitted into chamber 62, and vacuum is transmitted into nozzle 24 from outflow connection 21, nozzle 24 is laterally compressed such that the seal strips 16 and 18 are further tightened. When vacuum is transmitted into chamber 62, nozzle 26 is laterally expanded such that the seal strips 16 and 18 are pulled apart thus forming an open mouth. Wastewater can be evacuated through this open mouth in the direction of arrow 13. If a high pressure would be transmitted into nozzle 26 through inflow connection 23, an elevated pressure should be transmitted into chamber 62 to keep the interface valve closed. The elevated pressure can be transmitted pneumatically or hydraulically.

In order to prevent nozzle 24 from becoming deformed by vacuum transmitted through outflow connection 21 such that nozzle 24 assumes a concave shape, the sections 20 and 28 should be reinforced, e.g. by thick material, metal plates or metal strips. The reinforced sections 20 and 28 can be pre-stressed such that they maintain a convex shape as long as there is no pressure difference between nozzle 24 and chamber 62, and assume a more or less straight shape when vacuum is transmitted to nozzle 24. In this way it is guaranteed that the seal strips 16 and 16 remain pressed against each other, and leakage does not occur between the seal strips 16 and 18.

Figure 3:
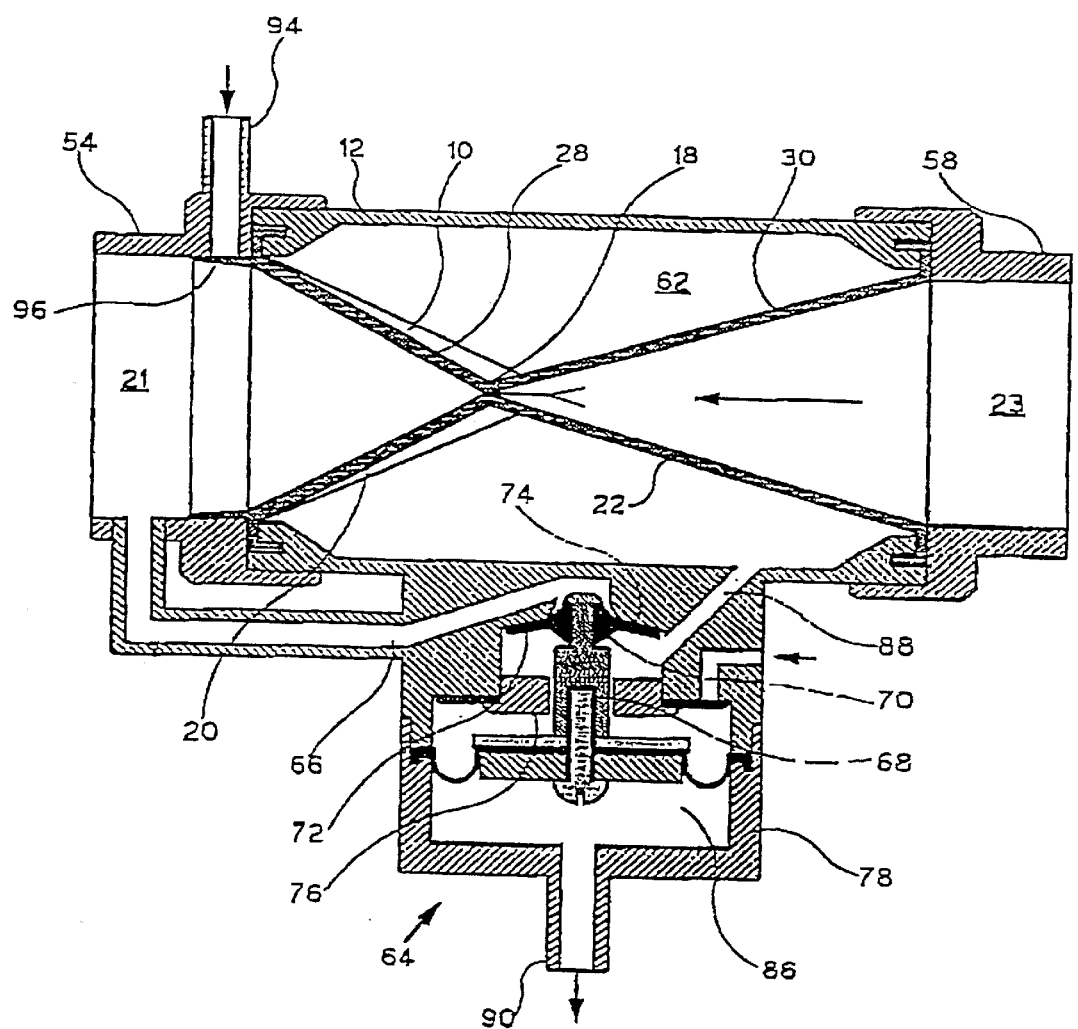
FIG. 3 shows an axial cross section through another interface valve, with an integral servo-valve, in closed position.
Figure 4:
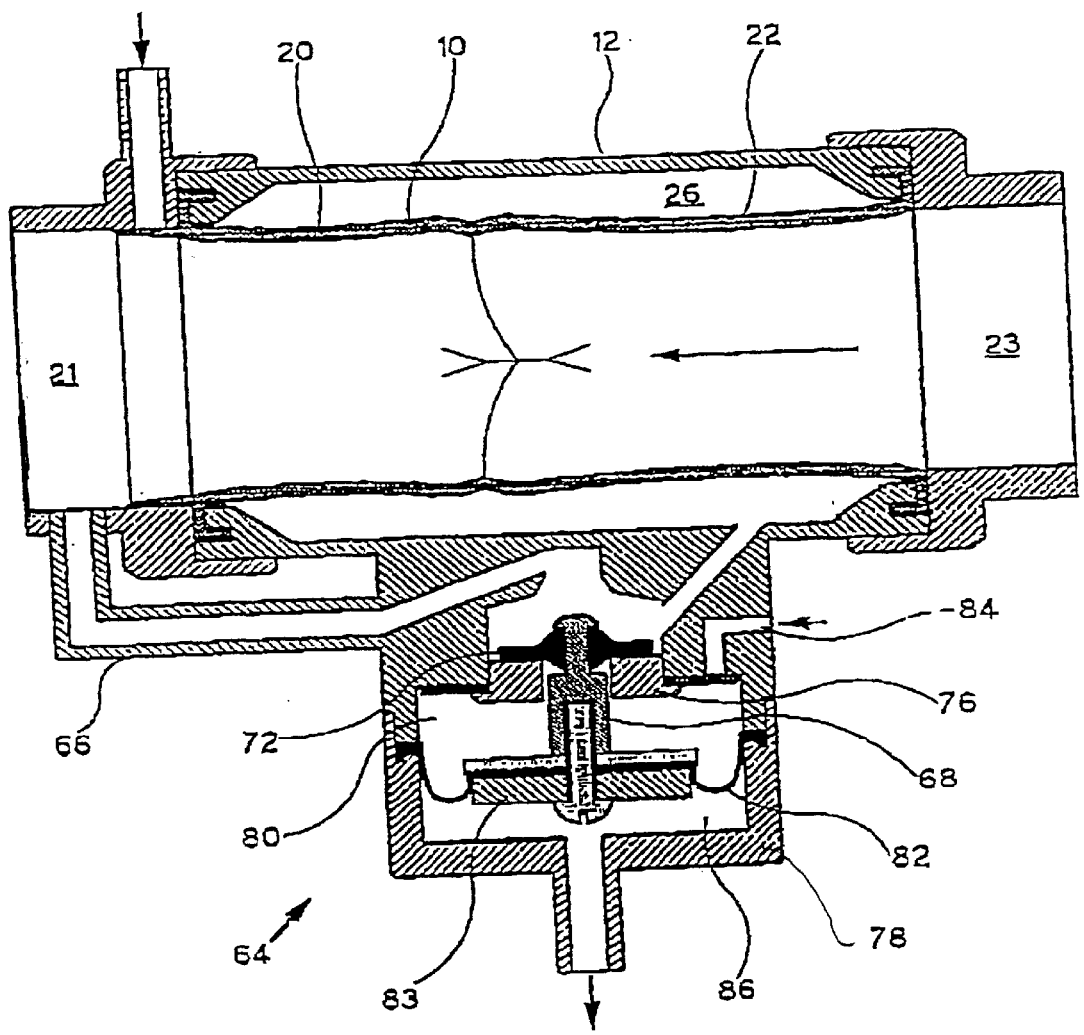
FIG. 4 shows the interface valve of FIG. 3 in open position.

FIGS. 3 and 4 show further improvements of the interface valve. A servo valve 64 is connected with chamber 62. Servo valve 64 either transmits atmospheric or above atmospheric pressure to chamber 62, to keep the interface valve closed, or transmits vacuum to chamber 62, to open the interface valve. Servo valve 64 opens or closes a conduit 66 between outflow connection 21 and chamber 62. Conduit 66 is closed when a valve piston 68 moves valve disk 70 and a seal element 72 against a valve seat 74 (see FIG. 3). Conduit 66 is opened when valve piston 68 removes valve disk 70 and seal element 72 from valve seat 74. Valve piston 68 is guided through a ring-shaped insert 76 in a valve body 78. Valve disk 70 seals a gap between piston 68 and insert 76 when the valve disk 70 is removed from valve seat 74 (see FIG. 4). In this position, a first chamber 80 in valve body 78 is isolated from conduit 66 and interface valve chamber 62. The first chamber is connected with atmosphere and ventilated through a bore 84, and separated from a second chamber 86 in valve casing 78 by a diaphragm 82. The second chamber 86 is connectable through connection 90 to atmospheric or vacuum pressure.

Valve piston 68 is connected with a plate 83. Diaphragm 82 is attached to plate 83 such that plate 83 is moved by pressure difference between the chambers 80 and 86.

The interface valve remains closed (see FIG. 3) as long as atmospheric pressure is transmitted into the interface valve chamber 62 through bore 84, the first chamber 80, through a gap between piston 68 and insert 76 and a bore 88. Conduit 66 is kept closed by a spring force, generated e.g. by diaphragm 82.

The interface valve is opened by transmittal of vacuum, e.g. from a controller, through connection 90 into the second chamber 86 of servo-valve 64. The difference between atmospheric pressure in the first chamber 80 and the vacuum pressure in the second chamber 86 moves diaphragm 82, valve piston 68 and valve disk 70 away from valve seat 74 thus opening conduit 66. Vacuum is transmitted from outflow connection 21 into chamber 62. At the same time, valve disk 70 shuts the gap between piston 68 and insert 76 thus preventing further ventilation of chamber 62. Chamber 62 is evacuated, elastic element 10 is pulled open and wastewater is evacuated through the interface valve (see FIG. 4).

The interface valve is closed after evacuation of wastewater by transmitting atmospheric pressure, e.g. from a controller, through connection 90 into the second chamber 86. Diaphragm 82 and valve disk 70 return, and valve seat 74 is closed by valve disk 70. Conduit 66 is closed. Chamber 62 is ventilated through bore 88, the now open gap between piston 68 and insert 76 and through the first chamber 80 and bore 84. Atmospheric pressure is transmitted into chamber 62 and elastic element 10 is closed.

A pneumatic controller (not shown), controlling operation of the interface valve, is supplied with vacuum pressure from the outflow connection 21 through a connection 94. To prevent wastewater entering the controller from outflow connection 21 through connection 94, a seal lip 96 is provided. Seal lip 96 is preferably an extension of the elastic element 10, more specifically, of its rear rim 32. Seal lip 96 acts like a check valve preventing flow from outflow connection 21 into connection 94, but permitting flow from the controller through connection 94 into outflow connection 21.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An interface valve for a vacuum sewer system comprising:
   a valve casing;
   a valve chamber in the casing;
   a pneumatic connection, penetrating the valve casing;
   an inflow connection to the valve casing for entrance of wastewater;
   an outflow connection from the valve casing for exit of wastewater towards a vacuum source; and
   an elastic sleeve element that is axially arranged within the valve chamber between the inflow connection and the outflow connection, the elastic sleeve element comprising a laterally extending seal section, the sleeve element being compressed in an axial direction relative to the valve chamber by an axial compression force that is generating a lateral tightening force on the seal section such that the seal section is closed for wastewater flow while the valve chamber is connected through the pneumatic connection to atmosphere, and that the seal section is opened for wastewater flow while the valve chamber is connected through the pneumatic connection to the vacuum source.

2. An interface valve as described in claim 1 whereby the seal section is formed by a pair of laterally extending seal strips.

3. An interface valve as described in claim 2 whereby the seal strips are pressed against each other when the elastic sleeve element is axially compressed.

4. An interface valve as described in claim 2 whereby the seal strips are reinforced.

5. An interface valve as described in claim 2 whereby the outflow connection has an internal diameter D and both seal strips have the same length $L \geq \frac{1}{2}\pi * D$.

6. An interface valve as described in claim 2 whereby the common base line is curved.

7. An interface valve as described in claim 6 whereby the inflow section is longer than the outflow section and the seal section is convex toward the outflow section.

8. An interface valve as described in claim 1 whereby the elastic sleeve element has a nozzle-shaped inflow section, extending from the laterally extending seal section to the inflow connection, and a nozzle shaped outflow section, extending from the laterally extending seal section to the outflow connection.

9. An interface valve as described in claim 8 whereby the inflow section is longer than the outflow section.

10. An interface valve as described in claim 8 whereby the nozzle-shaped outflow section is reinforced.

11. An interface valve as described in claim 10 whereby trapezoid-shaped sub-sections of the nozzle-shaped outflow section are provided with metal inserts.

12. An interface valve as described in claim 11 whereby the metal inserts are bent such that the nozzle-shaped outflow section is convex between the seal section and the outflow connection.

13. An interface valve as described in claim 1 whereby the elastic sleeve element has an inflow rim and an outflow rim, the inflow rim being attached at the inflow connection of the valve casing, the outflow rim being attached to the outflow connection of the casing.

14. An interface valve as described in claim 13 whereby the rims are installed in peripheral grooves of the valve casing.

15. An interface valve as described in claim 13 whereby the distance between the rims of the elastic sleeve element is shortened by axial compression of the elastic sleeve element during assembly of the interface valve.

16. An interface valve as described in claim 13 whereby the rims are compressed between sockets and the valve casing.

17. An interface valve as described in claim 16 whereby the sockets are removably fixed to the valve casing.

18. An interface valve as described in claim 1 whereby the valve chamber is connected through a three-way valve either to the vacuum source or to atmosphere.

19. An interface valve as described in claim 18 whereby the three-way valve is integrated in the interface valve casing.

20. An interface valve as described in claim 18 whereby the three-way valve comprises a valve disk moving from a first to a second position, the valve disk in its first position closing a vacuum conduit toward the vacuum source and opening an atmospheric connection, and the valve disk in its second position closing the atmospheric connection and opening the vacuum conduit.

21. An interface valve as described in claim 20 whereby the valve disk is moved by a moving diaphragm, the diaphragm separating a first chamber from a second chamber, the first chamber being open to atmosphere and the second chamber being either connected to atmospheric or vacuum pressure for interface valve closing or opening.

22. An interface valve as described in claim 1 whereby the seal section is curved convex in the direction of the outflow connection.

23. An interface valve as described in claim 1 whereby a first lateral view of the elastic sleeve element shows the elastic sleeve element shaped like an hourglass with a slim waist, the seal section extending through the waist in view direction.

24. An interface valve as described in claim 1 whereby a first lateral view of the elastic sleeve element shows the elastic sleeve element shaped like two isosceles triangles, connected with each other at their angle points, the seal section extending through the common angle point in view direction.

25. An interface valve as described in claim 1 whereby the elastic sleeve element is laterally compressible by a pressure difference between the valve chamber and the outflow connection, the pressure difference creating an additional lateral compression force further tightening the seal section.

26. An interface valve as described in claim 1 whereby the seal section is located closer to the outflow connection than to the inflow connection.

27. An interface valve as described in claim 1 whereby the outflow connection is provided with a pneumatic connection to a pneumatic controller controlling operation of the interface valve, the pneumatic connection being covered by a lip extending from the elastic sleeve element and forming a check element permitting flow from the pneumatic controller into the outflow connection, but preventing flow of water and air from the outflow connection to the pneumatic controller.

28. An interface valve as described in claim 1 whereby the outflow connection has an internal diameter D and the elastic sleeve element has at any cross section perpendicular to its axis an internal perimeter $P \geq \pi * D$.

* * * * *